March 5, 1940. J. I. LINER 2,192,447
THERMOELECTRIC LIQUID LEVEL GAUGE
Filed June 30, 1937 5 Sheets-Sheet 1
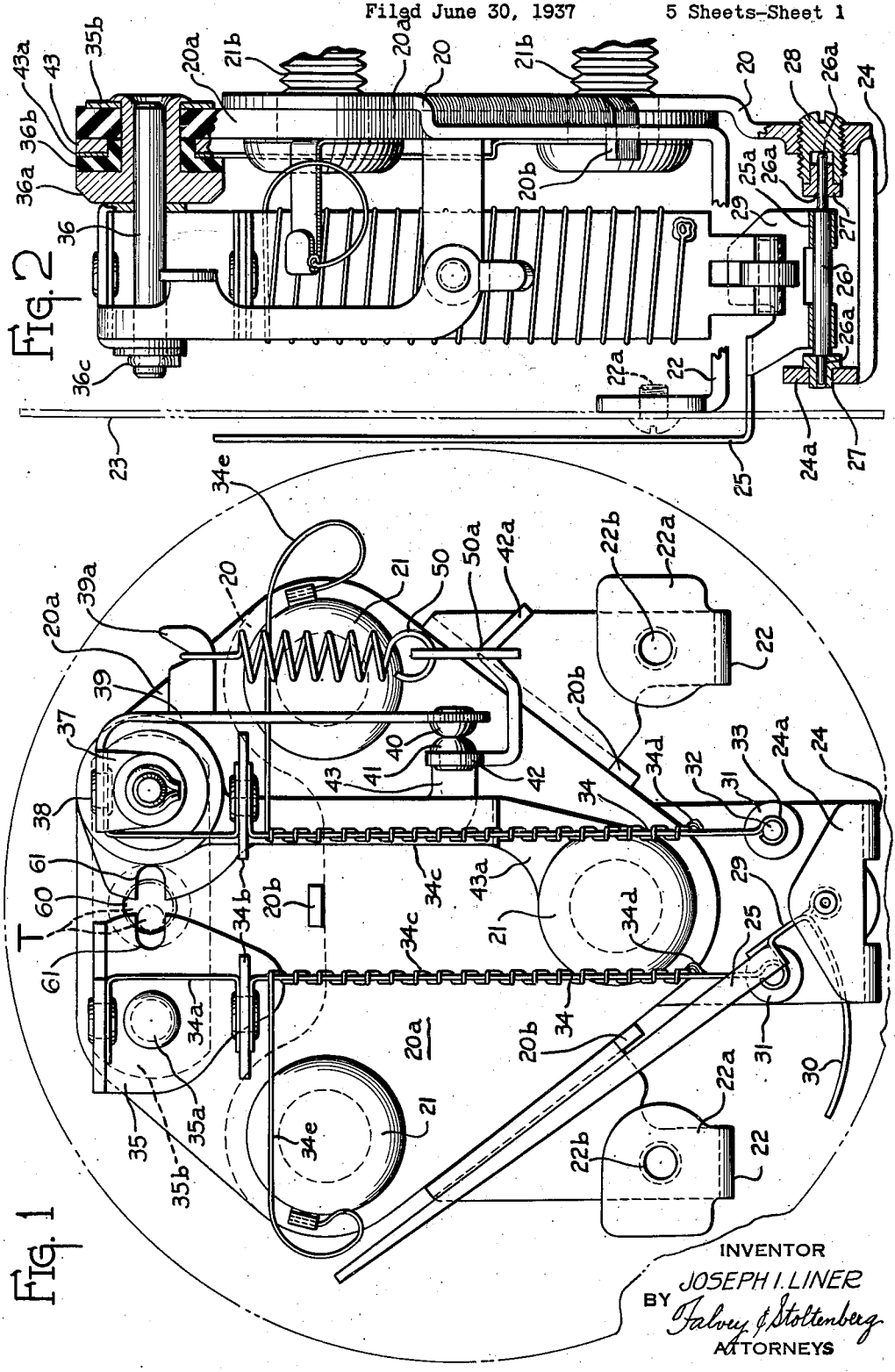
INVENTOR
JOSEPH I. LINER
BY *Falvey & Stoltenberg*
ATTORNEYS March 5, 1940.　　　　J. I. LINER　　　　2,192,447
THERMOELECTRIC LIQUID LEVEL GAUGE
Filed June 30, 1937　　　5 Sheets-Sheet 2

INVENTOR
JOSEPH I. LINER
BY Falvey & Stoltenberg
ATTORNEYS

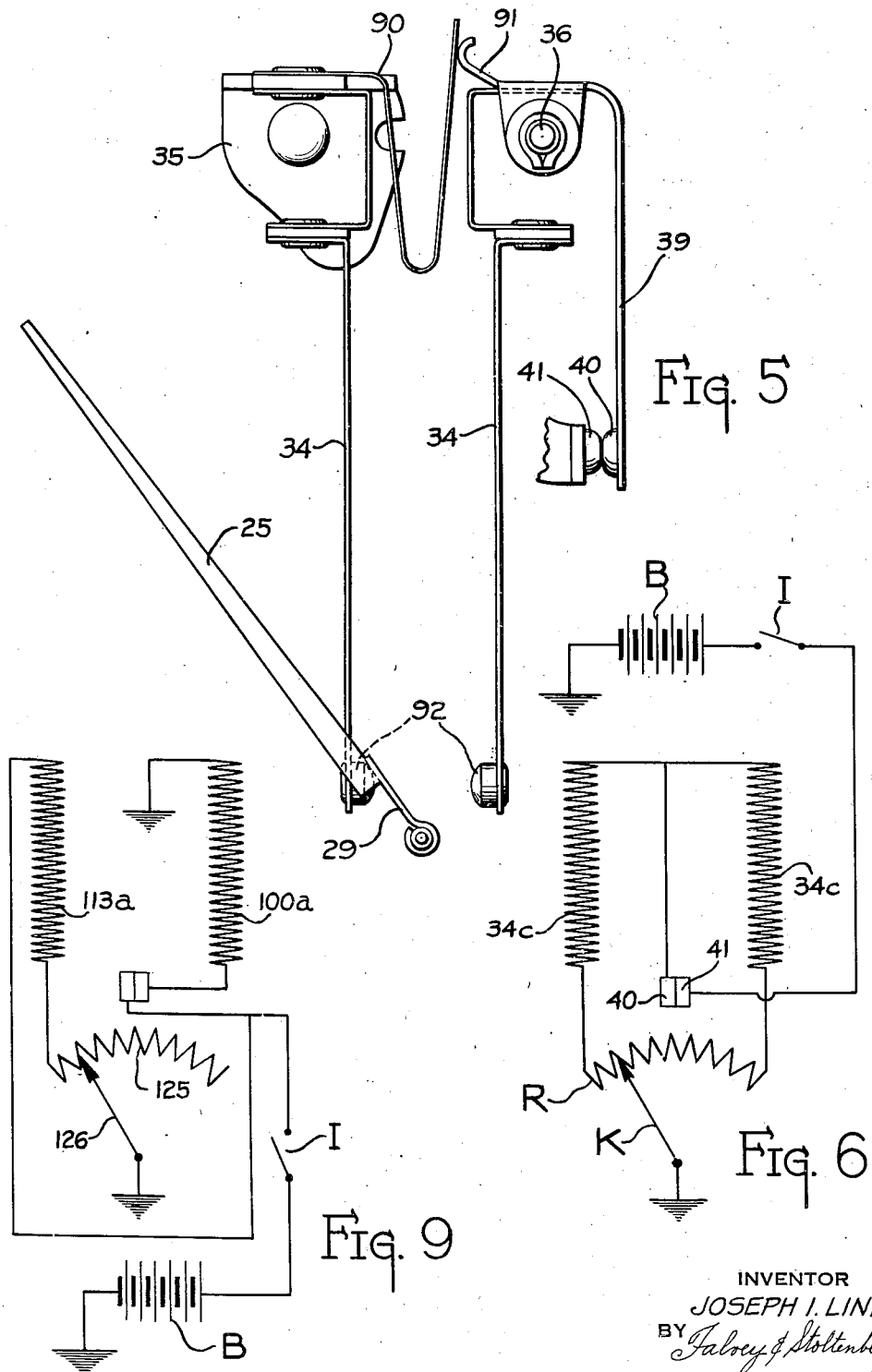

March 5, 1940.　　　　J. I. LINER　　　　2,192,447
THERMOELECTRIC LIQUID LEVEL GAUGE
Filed June 30, 1937　　　5 Sheets-Sheet 4

INVENTOR
JOSEPH I. LINER
BY Falvey & Stoltenberg
ATTORNEYS

Patented Mar. 5, 1940

2,192,447

UNITED STATES PATENT OFFICE 2,192,447

THERMOELECTRIC LIQUID LEVEL GAUGE

Joseph I. Liner, Toledo, Ohio

Application June 30, 1937, Serial No. 151,245

23 Claims. (Cl. 177—351)

This invention relates to thermoelectric measuring instruments, more particularly to a thermoelectric liquid level gauge.

In the past, thermoelectric indicating instruments have been used extensively to indicate variations of current flowing in electrical circuits. Instruments of this type have the advantage of integrating minor variations of current occurring over short time intervals and have, therefore, been used under circumstances where these slight current variations tend to vibrate the indicating pointer and destroy the accuracy of the reading. This inertia of the thermoelectric indicating instrument has the disadvantage, however, of being too sluggish, the time required to obtain an accurate reading being too long, inasmuch as the movement of the indicating pointer is at first very rapid and then slowly approaches a final state of rest. Some thermoelectric instruments require several minutes to obtain the final settled condition at which an accurate reading may be obtained. An instrument having this characteristic is not suitable for use as an indicating or measuring instrument in applications where a final reading is desirable within a reasonably short period of time such as, for example, in a thermoelectric liquid level gauge. At the same time, it is desirable to have a slight inertia in the instrument, so that the indicating pointer will not respond to minor variations of high frequency in the current value such as, for example, in the thermoelectric liquid level gauge suggested, the variations in current arising from ripples on the surface of the liquid fuel of a gasoline tank during movement of the vehicle.

This invention contemplates the provision of an indicating or measuring instrument which overcomes the defects and disadvantages pointed out in the previous paragraph, by providing a thermoelectric measuring or indicating instrument which will not respond to minor variations or fluctuations of high frequency in current and yet will be sufficiently rapid to give an accurate indication within a reasonable period of time controlled for the use to which the measuring or indicating instrument is placed, such as, for example, in a thermoelectric liquid level gauge.

The invention contemplates the provision of a circuit-breaking device, cooperating with and controlled by the thermal elements of the thermoelectric instrument, so that the heating current for the thermal elements, as measured and controlled by a proper extraneous initiating circuit, will be broken up into a series of pulsations whose values are determined by the temperatures of the thermal elements, with the result, that the temperatures of the thermal elements may be maintained within predetermined limits of variation. By the use of pulsations in the heating current, the response of the thermal elements to changes in temperature as initiated by the heating current is maintained in the quick-response stage, and the slow-response stage, during which the deflection or response slowly approaches the final state, is completely avoided. The energy supplied to electric heaters for heating the thermal elements, as controlled by the extraneous initiating circuit for proportionate indication of the physical effect to be measured, is maintained, preferably, at a much higher value than is necessary to obtain the desired deflection if the full response curve were followed.

When the circuit is opened by the action of the circuit-breaking device, a cooling period will set in which will quickly lower the temperature of the thermal element to the lower limit of the predetermined variation, and allow the circuit-breaking device to close again to begin a new heating cycle. In this manner, the use of pulsations of high current gives a measuring or indicating instrument which will have the desired inertia, and, at the same time, will respond with reasonable rapidity to changes in the extraneous initiating circuit. Minor fluctuations of high frequency in the current value will be absorbed by the inertia of the thermal element.

The invention contemplates the provision of a circuit-breaking device to be used as a safety valve, so that the current flowing through any heating coil cooperating with the thermal elements will be broken when the temperature of the thermal element approaches a predetermined maximum, and so prevent a destructive temperature rise in the heating coils.

It is, therefore, a principal object of this invention to provide a thermoelectric measuring and/or indicating instrument with an inherent controlling device, which will open and close the circuit through the heater of the thermal means under the influence of the thermal means to cause the thermal means to react in the quick-response portion of its bending curve to respond quickly to a new condition to be measured and/or indicated.

It is a further object of this invention to provide a thermoelectric measuring and/or indicating instrument using thermal means having a temperature-bending curve for heating and cooling which has a quick-response in the initial stages and a slow-response at the final stages, in conjunction with a heater means having a high capacity and a circuit-breaker means cooperating with the thermal means to open and close the circuit through the heater means for maintaining the temperature of the thermal means within predetermined limits, and thereby maintain the thermal means responsive to extraneous control in the quick-response stage to changes of condition to be measured and/or indicated.

It is a further object of this invention to provide a thermoelectric measuring and/or indicating instrument in which the response of the thermal element is maintained on the rapid-flexure portion of the time-deflection curve to make the response of the indicating pointer as quick as possible and thereby partially overcome the inherent inertia of the thermal element to obtain a desirable rate of change of the indicating pointer to variations of the condition to be measured and/or indicated.

It is a further object of this invention to provide a circuit-breaker for the heater element circuit of a thermoelectric measuring and/or indicating instrument which will be controlled by the instrument and will feed the current to the heater element or elements in a manner to maintain a minimum of heat in the thermally responsive element or elements to obtain an accurate reading, and thereby increase the speed of response of the instrument to variations of the condition to be measured and/or indicated.

It is a further object of this invention to provide a compact means to compensate for ambient temperature, which will conserve space to allow the use of a thermal element of maximum deflective powers.

It is a further object of this invention to provide a thermoelectric indicating instrument which is corrected for variations in ambient temperature and voltage, in which the energy applied to the thermal element is capable of being broken into pulsations to provide a quick response to change in the condition to be measured or indicated and to maintain a substantially uniform energy input into the indicating instrument.

It is a further object of this invention to provide a safety controlling device for a thermoelectric indicating instrument which will prevent a destructive rise of temperature in the heater coils of the thermal elements under unbalanced circuit conditions arising from a short or open circuit or the like.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Figure 1 is a plan view of the indicating instrument.

Figure 2 is a side elevational view, partly in section, of the indicating instrument shown in Figure 1.

Figure 5 is a plan view of another modification of the instrument shown in Figure 1.

Figure 6 is a schematic diagram of connections of the instrument shown in Figures 1 and 5.

Figure 9 is a schematic diagram of connections for use with the indicating instrument shown in Figure 7.

Figure 4:
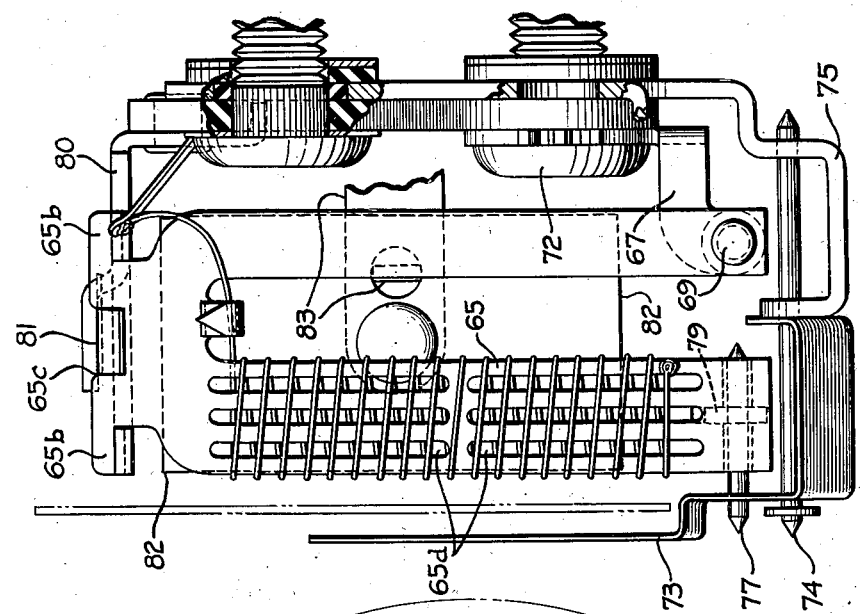
Figure 4 is the side elevational view, partly in section, of the indicating instrument shown in Figure 3.

Referring to the drawings, particularly to Figure 1, a base 20 is provided preferably made of metal upon which the operating elements of the indicating instrument are mounted. The base 20 is perforated at desirable locations to allow the mounting of three binding posts 21, so that the heads will be available for making proper connections with the electrical portions of the indicating instrument circuit, while the shanks 21B project laterally from the rear of the base 20 to allow the instrument to be properly mounted upon the panel (not shown). The binding posts 21 are preferably insulated from the base 20 by being positioned in an insulating plate 20A fastened to the base 20 by embracing lugs 20B.

At a convenient point, preferably on the lower end on the base 20, the upwardly struck flanges 22 are provided which have at their upper ends inwardly struck flanges 22A which are provided with threaded apertures 22B to support by means of screws, a suitable indicator dial 23 as shown in phantom in Figure 2. The indicator dial may be provided with a suitable scale of predetermined divisions to cooperate with indicating means to be described hereinafter.

Adjacent the lower end of the base 20 another upwardly struck flange 24 is provided having an inwardly struck flange 24A. Between the base member 20 and the flange 24A, an indicating pointer 25 is suspended by means of a spindle 26 to which the pointer 25 is attached in any suitable manner as, for example, by sleeves 25A. The spindle 26 is turned down adjacent its end to form the pintles 26A which cooperate with bushings 27 to form journals about which the spindle 26 may rotate to position the pointer 25 in any desirable angle with regard to the dial 23. The journals 27 are fixedly held in the flange 24A and an adjusting screw 28 respectively; the adjusting screw 28 is preferably threaded in an aperture in the base member 20.

Extending radially from the spindle 26, and preferably integral with the indicating pointer 25, a vane 29 is provided which may be coplanar with the indicating pointer 25. Extending laterally from the vane 29, a counter-balance 30 is provided which is utilized to return the indicating pointer 25 to a zero position, preferably located at the left side of the instrument as shown in Figure 1.

To cooperate with the vane 29 by acting on opposite sides thereof, a pair of rollers 31 is provided, positioned upon spindles 32 journaled in eyelets 33, to make effective the bending action of bimetallic strips 34 to move the indicating pointer 25 relative to the dial 23 by integrating the deflections of the two bimetallic strips. One of the bimetallic strips is anchored upon a bracket 35 attached to the insulating base portion 20A by means of a rivet 35A; the second bimetallic strip will be mounted upon a vertical spindle 36 by means of a hinged joint formed by a stirrup 37 whose parallel flanges are perforated to form journals for the spindle 36. The lower end of the spindle 36 is press-fitted into a bushing 36A, which is provided with insulating washers whose use is to be described hereinafter. The bushing 36A fits into an aperture in the insulating base 20A, and cooperates with a connecting strap 35B, connecting the bushing 36A to the bracket 35 by means of the rivet 35A. The projecting portion of the bushing 36A is riveted over as shown in Figure 2 to hold the parts in cooperative relation.

The second bimetallic strip is attached to the stirrup 37 by means of the rivet 38 fitted into cooperating apertures in the right angle flange of the bimetallic strip and the stirrup 37. The rivet 38 is also used to attach an angle bar 39 to which is fixed a contact point 40. Contact point 40 cooperates with the second contact point 41 which is fixed to an upstanding portion 42 of a bracket 43. The bracket 43 is pivoted for rotation about a common center with the spindle 36. The bushing 36A and the insulating washer 36B provide a journal for the bracket 43 which allows the bracket to be rotated about the center of the spindle 36. This construction forms the nucleus of an adjusting means for the contact points 40 and 41 which will be described further hereinafter.

Bimetallic strips 34 are inherently corrected for changes in ambient temperature by the provision of a second bimetallic strip 34A generally in the form of a channel which is attached to the other by a rivet or any other convenient means. Preferably the two portions are insulated from each other by means of discs 34B to prevent transfer of heat therebetween in any substantial degree, the rivet electrically connecting the parts to allow current flow. The action of this ambient temperature compensating means is obtained largely by the action of the comparatively sharp angles of the channel, and allows the means to be compacted into a minimum of space to comply with commercial requirements and yet allows the use of thermal elements of maximum deflective capacity.

Each of the bimetallic strips 34 is provided with a heater coil 34B comprising resistance wire wrapped about the body of the bimetallic strip to allow an efficient heat transfer between the heater coil and the bimetallic strip. Adjacent the lower end of the bimetallic strips 34, the ends of the heater coils 34B are preferably soldered directly to the body of the strips as shown at 34D. In this manner, the heater coils of the separate bimetallic strips are connected together by being locally grounded to the strips, which are connected together by the connecting strap 35B. The other ends of the individual heating coils are provided with pig-tails 34E which are connected by the binding posts 21 by soldering or any other convenient means.

The bimetallic strip which is attached to the stirrup 37 is free to rotate about the spindle 36, the stirrup 37 being held in position on the spindle by means of a crimp washer 36C. By having the bimetallic strip and the angle bar 39 both attached to the stirrup 37, any extraneous force on the bimetallic strip will rotate both parts as a unit about the spindle 36. In this manner, the movement of the contact point 40 with reference to the contact point 41 will be controlled by torque acting on the unit to control an electric circuit therebetween. It is desirable to maintain the contact points 40 and 41 in touching relation to maintain the electrical circuit therethrough complete, and for this purpose a resilient means 50 is provided which acts between a notched ear 39A on the angle bar 39 and a laterally extending bracket 42A on the bracket 43, an insulating washer 50A being provided to isolate the electrical parts of the circuit and to prevent a short-circuit through the resilient means 50.

The contact point 41 is placed in electrical circuit with the lower binding post 21 by means of a connecting strap 43A, which is also positioned about the bushing 36A as is shown in Figure 2. The electrical circuit through the instrument begins with the lower binding post 21, thence through the connector 43A to the bracket 43, and thence to the contact point 41. At this point, where the circuit is adapted to be broken, the contact point 40 continues the circuit which traverses the arm 39 to the stirrup 38 through the bushing 36A to a connector strap 35B, thence to the rivet 35A to the bracket 35 forming a local ground circuit. From this point, the circuit divides and leads to the lower ends of the heater coils which are soldered to the bimetallic strips 34, a part of the local ground circuit. The circuit continues through each of the heater coils 34B and terminates at the two upper binding posts. The cooperation of this instrument with an extraneous initiating circuit will be described in detail hereinafter in connection with the operating characteristics of the instrument.

Three adjustments are provided for the indicating instrument to determine the zero scale position of the pointer, the swing of the pointer with regard to the dial or the full scale position and the amount of torque necessary to operate the circuit-breaker. The first two adjustments are localized for convenience at a point between the pivots of the two bimetallic elements 34, so that both adjustments can be made from this one position. To attain this end, an aperture 60 is provided in the insulating base 20A and the connector plate 35B which allows the ready insertion of a tool T from the lower side of the base of the instrument. Notches 61 are provided in the bracket 35 which holds the left bimetallic strip 34 in position (Figure 1), and in the bracket 43 which carries the contact point 41. The notches 61 are cut so as to project over the aperture 60 to give a tool inserted therein a proper leverage to rotate the bracket 35 about its fixing rivet 35A, and also the bracket 43 about the bushing 36A. By the use of these adjustments, the zero position of the instrument and the swing of the needle may be readily adjusted to compensate for manufacturing tolerances.

The amount of force required to rotate the right bimetallic strip 34 (Figure 1) about its pivot 36 is dependent upon the tension of the resilient means 50. The tension of the resilient means 50 which holds the contact points 40 and 41 in contacting relation is controlled by bending the lateral arm 42A of the upstanding flange 42 of the bracket 43, and may be varied within reasonable limits to control the torque necessary to open the contacts 40 and 41.

Figure 3:
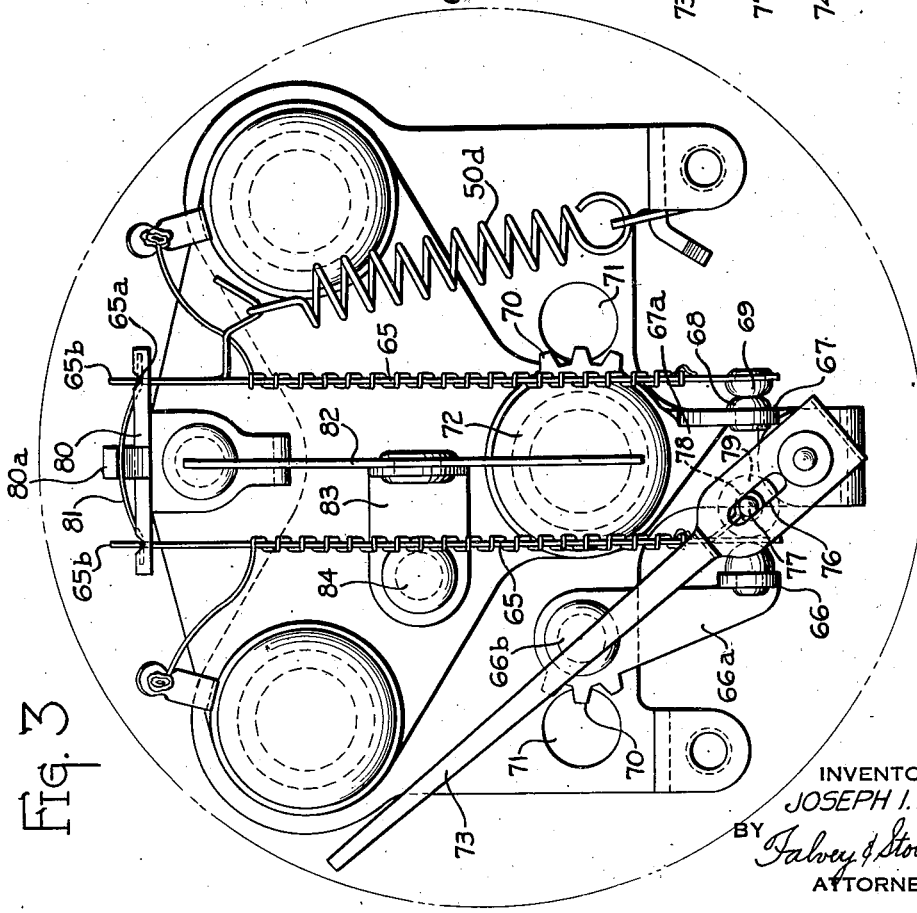
Figure 3 is a plan view of the modification of the indicating instrument in Figure 1.

*Modification shown in Figures 3 and 4*

The indicating instrument shown in these figures operates in a manner similar to the one shown in Figures 1 and 2, a principal difference between the two instruments being the method of obtaining ambient temperature compensation.

The method of constructing the mechanical means to give an efficient operating mechanism is also varied.

The ambient temperature correction of the bimetallic strips 65 is obtained by constructing the elements in the general shape of a hair-pin, one arm of which carries the heater coil and the other arm being free and exposed to the ambient temperature. The free arm of the bimetallic strips 65 cooperates with a relatively fixed point 66 mounted on a relatively movable bracket 66A in case of the left bimetallic strip (Figure 3) and a second fixed point 67 mounted on a bracket 67A in case of the right bimetallic strip. The fixed point 67 has a dual function, however, by being a part of the circuit-breaker and hence is provided with a contact point 68 which is in operative alignment with a second contact point 69 positioned on the free arm of the right bimetallic strip 65. The fixed points 66 and 67, including the contact point 68, are provided with adjusting means in any convenient manner such as, for example, racks 70 which are in cooperative relation with apertures 71 in the base member, so that a proper tool may be projected through the apertures 71 to rotate the bracket 66A about the rivet 66B to adjust the fixed point 66 and to rotate the bracket 67A about the binding post 72 to adjust the point 67.

In this modification, the indicating pointer 73 is mounted for rotation about the spindle 74 which is fixedly held in position on a bracket 75 extending from the base member. Eccentric from the spindle 74, a slot 76 is provided in the body of the pointer 73, into which projects a pintle 77 fixed in an eye 78 on the end of the left bimetallic strip 65 (Figure 3). The pintle 77 is also provided with a roller 79 which cooperates with the right bimetallic strip 65 to position the pointer through the action of the pintle 77 in the slot 76 about the spindle 74 at a proper indicating position at a point integrating the deflections of the two strips under circumstances to be described hereinafter.

The bimetallic strips 65 in this modification are suspended in substantially parallel relation upon pivots which comprise notches 65A in a slotted upright member 80 extending from the base and cooperating laterally extending flanges 65B of the bimetallic strips. To hold the flanges 65B in engagement with the notches 65A, a spring member 81 is provided which cooperates with the abutting flange 80A struck up on the upright member 80 and with the bimetallic strips in a slot 65C to apply a force at a point approximating the center line of the cooperational relation between the flanges 65B and the notches 65A.

The right bimetallic strip 65 (Figure 3) is provided with a resilient means 50D to hold the contacts 68 and 69 in touching relation in a manner similar to the modification described above. To prevent transfer of heat between the two bimetallic strips 65 through radiation, a baffle plate 82 is provided, which is positioned between the two bimetallic strips by means of a bracket 83 attached to the base in any convenient manner as, for example, by rivet 84. The section between the arms of the hair-pin-shaped bimetallic strip is made comparatively small, so that a minimum of heat is transferred from the heated arm to the arm designed to be responsive to ambient temperature.

This modification is also provided with three binding posts in a manner similar to the modification described above, and the electrical circuit therethrough is substantially the same and need not again be described in detail. To obtain better heat radiating characteristics, which affects the responsive speed of the instrument, the bimetallic strips 65 are provided with elongated parallel slots 65D in their body, the slots or openings taking any convenient form dictated by the conditions under which the instrument is used.

*Modification shown in Figure 5*

In this figure, there is shown a modification of the invention in which the resilient means to hold the contact points in circuit-making relation is modified, a strip of spring material 90 being provided to thrust the bimetallic strip 34 about its pivot spindle 36. The spring strip 90 is anchored to the bracket 35 preferably by the same rivet which holds the left-hand bimetallic strip 34 in position. The spring strip 90 is bent in an elongated bight to extend between the bimetallic strips, the free end of which is adapted to cooperate with a U-strap 91 to rotate the right-hand bimetallic strip about its pivot 36 to close the contacts 40 and 41. The strap 91 allows the spring 90 to apply a torque to the bimetallic strip 34 and the angle bar 39 by applying a force eccentric to the spindle 36.

In this figure, the rollers 31 in the modification illustrated in Figures 1 and 2 mounted on the lower end of the bimetallic strips 34 to cooperate with the vane 29 on the indicating pointer is replaced by means of insulating buttons 92. The forward contacting surface of the insulating buttons 92 is rounded and mounted to allow cooperative relation to exist with the vane 29 with the least possible friction.

*Operation of the modification shown in Figures 1 to 5*

Referring to Figure 6 of the drawings, the diagram of connections of the modification shown in Figures 1 to 5 is diagrammatically illustrated. A rheostatic resistance R is connected in series circuit with the heater coils 34C whose distal ends are connected together and led to the contact point 40. The contact point 41 is connected to an ignition switch I or other manual circuit-controlling device and thence to a battery B which commonly has one terminal grounded. The circuit is then completed by having a contact arm K grounded and cooperating with the rheostatic resistance R. The contact arm K is responsive to changes of a physical effect to change its position proportionate to changes of the physical effect on the rheostatic resistance R. The physical effects which control the position of the contact arm K may be, for example, a float cooperating with the variable liquid level. As is well known, the current flowing in the heater coils 34C is directly proportionate to the position of the contact arm K on the resistance R, the current dividing to flow through the parallel heater coil circuits. The current flowing in the coils is the same in only one position at which the contact arm K divides the resistance R into two equal portions. The resistances of the heater coils 34C are preferably equal in amount.

As described above, the heater coils 34C are wound about the bodies of the bimetallic strips 34 and their heating effect is controlled by the amount of current blowing through each respectively, so that the heat supplied to the bimetallic elements 34 can be varied with ease. In this manner, the heat supplied to the bimetallic elements 34 is dependent upon the position of the contact arm K controlled by the physical effect.

As the physical effect changes the position of the contact arm K with reference to the rheostatic resistance R, the temperatures of the heater coils 34C will vary in like proportion, which, in turn, varies the temperature of the bimetallic strips 34. The bimetallic strips 34 deflect in accordance to well known laws to the temperature thereof, and due to the varying currents in the heater coils temperatures generated thereby in the bimetallic strips, the deflections of the two bimetallic strips will be proportional to the change of the physical effect.

The two bimetallic strips are designed to deflect toward each other with the application of heat thereto, and are of such length that their ends will come into contactual relation when a relatively low amount of heat is supplied to the strips to create a relatively low temperature. The ends of the bimetallic strips, through the agency of the rollers 31, act upon the vane 29, and the position of the pointer 25, controlled by the vane 29, will be determined by the deflections of the two bimetallic strips. The pointer will, therefore, assume a proper position proportionate to the physical effect, as described above.

The relation between the heater coils and the rheostatic device connected in what is commonly known as potentiometer circuit, is well known in the art. This construction inherently corrects for voltage variations of the battery B because the current flowing in each arm of the parallel heater coil circuits will be changed substantially the same proportion. The circuit, however, has the disadvantage of applying more heat to the bimetallic elements than is necessary to obtain the deflections to position the pointer. The surplus heat, serving no useful purpose, is disadvantageous because a change in the position of the pointer may not take place until the surplus heat is dissipated by radiation. The surplus heat creates a tension or stress in the resilient bimetallic strips 34 which must be relaxed before the instrument can respond accurately to any changes in condition of the physical effect. An instrument of this kind, therefore, is slow to respond to changes in the physical effect and has an inertia which is too great to be useful in a practical indicating instrument.

The disadvantage pointed out in the previous paragraph is overcome by the addition of the contact points 40 and 41 which are connected in the circuit to act as a circuit-breaker for the current through both coils at times when the heat supplied to the bimetallic strips by the heater coils is greater than that heat which is necessary to create the proper temperature in and cause the necessary deflections of the bimetallic strips for positioning the pointer 25 at its true indicating point. As described above, the right-hand bimetallic strip in Figure 1, (also Figures 3 and 5) is adapted to rotate about pivot spindle 36 and when turned in a counter-clockwise direction against the action of the resilient means 50 (Figure 1) it will separate the contacts 40 and 41 and open the circuit through the heater coils.

As the bimetallic strips deflect under the influence of the heat supplied to them, they come into bucking relation with the vane 29 between the rollers 31, so that an integration takes place of the deflections of the two strips, and the pointer will assume a position proportionate to temperatures of the two strips. When, however, the deflection continues, due to application of surplus heat, the left-hand strip, which is anchored by the bracket 35 will apply a torque to the right-hand bimetallic strip communicated through the vane 29 to the lower end thereof. This torque tends to rotate the right-hand bimetallic strip 34 and the angle bar 39 including the contact point 40 in a counter-clockwise direction against the resilient means 50 around the pivot spindle 36. As the torque increases, the resistance of the resilient means will be overcome and the contact points 40 and 41 will be opened to break the circuit through the heater coils. When the circuit through the heater coils is broken, a cooling period will set in which will allow a relaxation of both elements to remove the torque from the right-hand bimetallic strip, so that the resilient means may again close the contact points and start a new cycle of operation.

Figure 10:
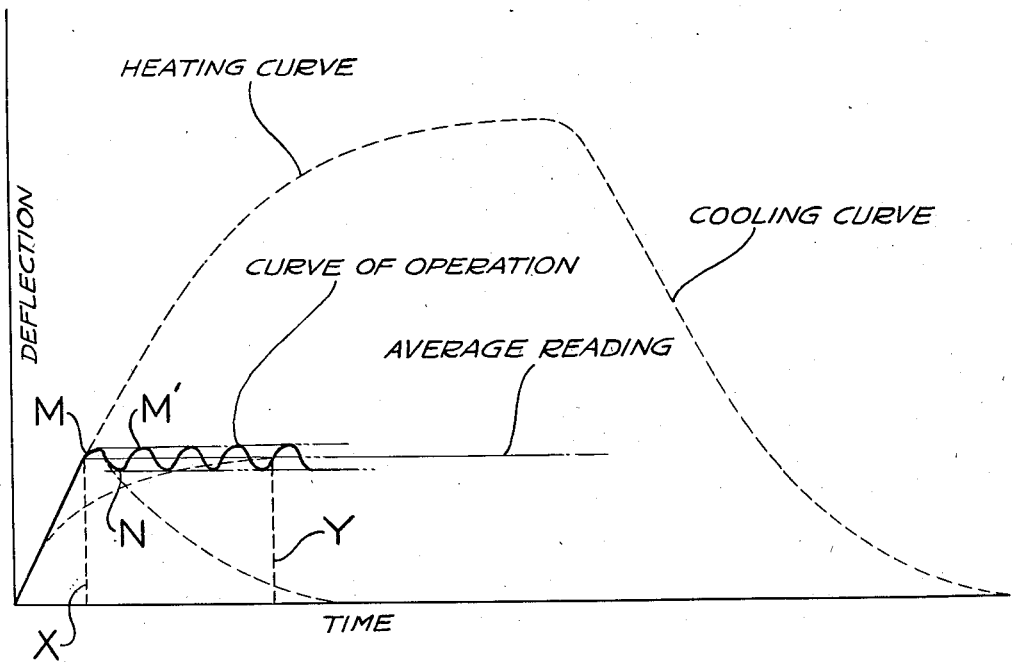
Figure 10 is a group of curves illustrating the mode of operation of the invention.

Referring to Figure 10 of the drawings, a set of curves is shown which is believed to be an accurate analysis of the conditions described above with reference to the action of the current upon each individual bimetallic strip, showing the effect of the circuit-breaking device upon the bending characteristics of the bimetallic strips. These curves are drawn with "deflection" as ordinate and "time" as abscissa. Assuming that deflection is measured from a zero point, which is corrected for ambient temperature as described above, and time is zero, a predetermined amount of current (relatively large) is applied to the heater coil of an individual bimetallic strip to change the temperature thereof and cause a deflection of the bimetallic strip which would have the characteristics shown generally in Figure 10 by the curve labeled "heating curve." It will be observed that this curve has a steep portion on the early stage and then gradually flattens out to approach a final deflection having at this part of the curve what may be called an asymptotic characteristic. Assuming that the current in the heater coil is broken at the highest point of the curve after the deflection has obtained substantially a final state, a cooling period will immediately set in which will allow a relaxation of the bimetallic strip which will follow the curve labeled "cooling curve." For convenience of illustration, the cooling curve has been joined to the heating curve to illustrate clearly the amount of time required by the bimetallic strip when heated with a predetermined amount of current to complete a heating and cooling cycle. It will be noticed that the cooling curve has an asymptotic characteristic similar to that of the heating curve except that the slow approach is obtained at the point where the bimetallic strip has zero deflection. In the early stages of the cooling curve, the rate of change is rapid, so that the deflection changes quickly.

The usual thermoelectric instrument follows the cycle described in the last paragraph in which the time consumed in making a complete cycle is prohibitive and destroys the feasibility of using the instrument as a practical indicating means. An instrument of this type has too much inertia and does not respond with the necessary rapidity to make it suitable for use as an indicating means, for example, on a thermoelectric gas gauge.

The circuit-breaker is, therefore, added to the usual construction and is designed to break the heating current at a point where the rate of deflection of the bimetallic strip with reference to time is still rapid as is shown by the solid curve in Figure 10. When the deflection of the bimetallic element reaches the point M, the circuit-breaker opens the circuit through the heater coils, so that a cooling period will set in which is shown by the dip in the deflection curve until the point N is reached. At this point, the circuit-breaker again closes the heater circuit and allows a new heating cycle to set in, which continues until the deflection attains a point M' when the circuit-breaker again opens. In this way, the circuit-breaker maintains the deflection and/or temperature (upon which deflection is dependent) within narrow limits, and, in each case, the heating and the cooling of the bimetallic element is maintained in the early stages of deflection where the response is rapid. The asymptotic or slow response portion of the time-deflection curve is avoided altogether and the inertia of the instrument is reduced to a point where the response will be sufficiently rapid to make an instrument useful for practical measuring purposes. On the other hand, a sufficient amount of the inherent inertia of the bimetallic strip is maintained, so that the instrument will not respond instantaneously to changes in the control circuit which, in many instances, is an advantage because it integrates minor variations in the measuring effect as controlled by the physical effect as described above.

To show the time-response relation between the inertia of an instrument employing the circuit-breaker, and an instrument using the full inherent inertia of the bimetallic strip, the lines "X" and "Y" are utilized which give the abscissa projections indicating the amount of time required to give the proper deflectional reading. The line "X" is the projection of the point "M" on the abscissa, while the line "Y" is a projection of the point at which the usual bimetallic strip, having its inherent inertia, reaches its full deflection by the use of a proper amount of current. It will be seen by comparison of these abscissa values that the time required to obtain the deflection with the use of the circuit-breaker is far less than that required to obtain the same deflection by the use of the normal bending characteristic.

By the use of the circuit-breaker, the temperature of the bimetallic strips is maintained within narrow limits, with practically no surplus heat present and when a change of condition occurs in the physical effect being measured, the response of the instrument to the new conditions will be very rapid. The fluctuations in the curve of operation of the instrument are very small and do not materially change the position of the pointer with regard to the scale, so that an average reading is readily obtained. For purposes of clarity, the fluctuations have been exaggerated in the illustration.

Figure 8:
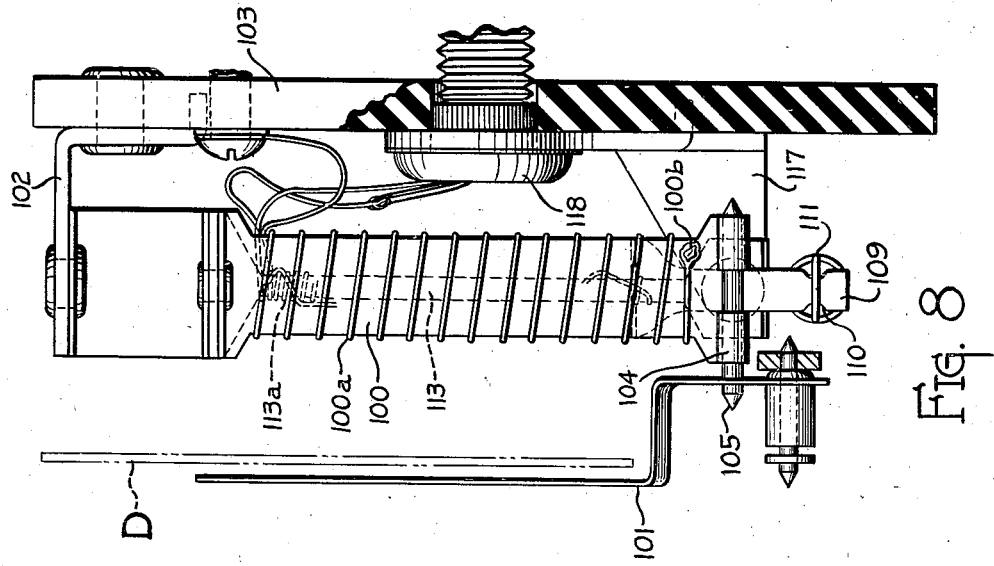
Figure 8 is a side elevational view, partly in section, of the indicating instrument shown in Figure 7.
Figure 7:
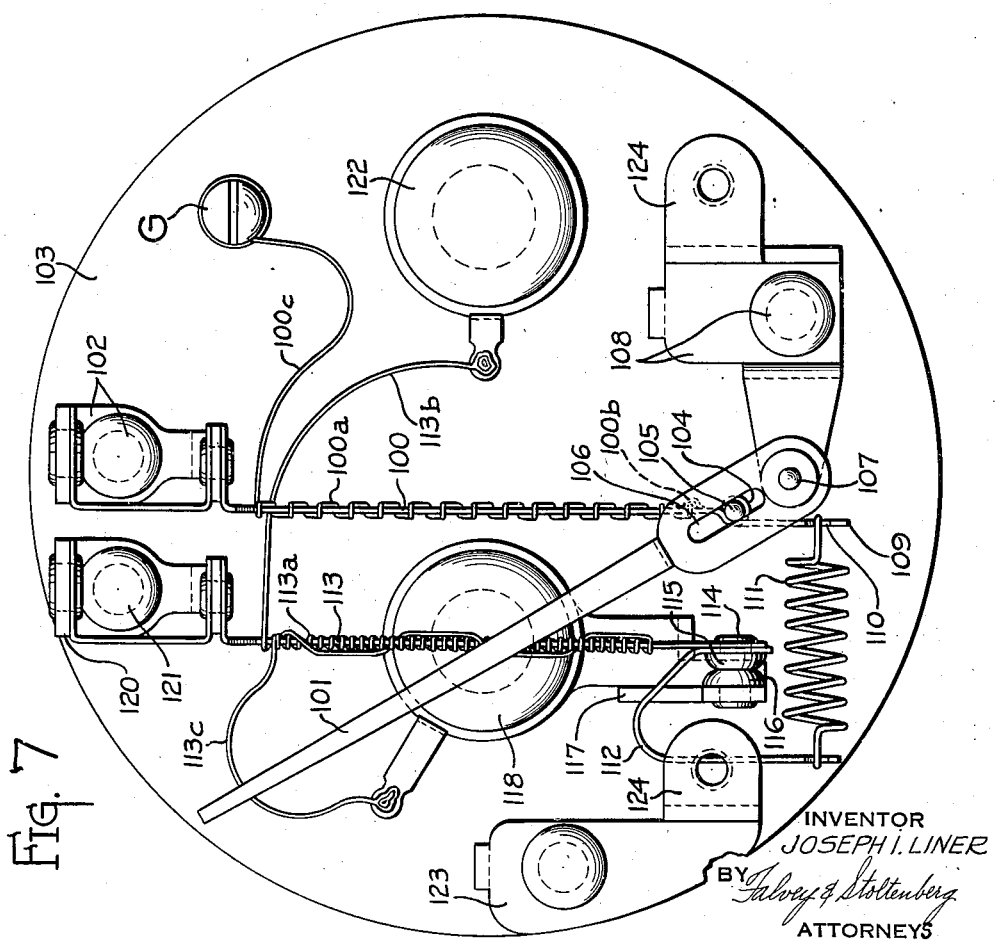
Figure 7 is a plan view of another modification of the invention.

*Modification shown in Figures 7, 8 and 9*

In this modification, a circuit-breaking device is employed to control within narrow limits the temperature of a thermal element used to move an indicating pointer across the scale, a mechanical means being supplied to control the movement of the contact points of the circuit-breaker; the movement of the contact points is further controlled by means of a second bimetallic strip which is influenced by thermal means proportionate to the change of a physical effect.

Referring to Figure 7 of the drawings, a bimetallic strip 100 is provided which is preferably of sufficient dimension to supply ample power to move an indicating pointer 101. The bimetallic strip 100 is compensated for ambient temperature in the same manner as described and is anchored by means of a bracket and rivet construction 102 to a suitable insulating base 103. Adjacent the end, opposite from its anchor, the bimetallic strip 10 is provided with eyelets 104 in which a pintle 105 is positioned to cooperate with a radial slot 106, in the pointer 101, which rotates about a pivot 107. The pivot 107 is anchored to the base 103 by means of a riveted bracket 108.

A projecting arm 109 is provided on the bimetallic strip 100 adjacent the eyelets 104 having notches 110 to cooperate with the end of a resilient means 111, the opposite end of which cooperates with a bracket 112 fastened to the end of a second bimetallic strip 113 (preferably of small dimension) by means of a rivet 114. The head of the rivet 114 is formed into a contact 115 and cooperates with a second contact 116, positioned on a bracket 117. The bracket 117 is held in operative relation with the base 103 by means of binding post 118.

The bimetallic strip 113 is preferably positioned in parallel relation with the bimetallic strip 100 and is also provided with the corrective means for changes of ambient temperature. Adjacent the end, opposite from the point where the contact point 115 is positioned, a bracket 120 is provided to anchor the bimetallic strip 113 to the base 103 by means of the rivet 121.

The bimetallic strips 100 and 113, are provided with heater coils 100A and 113A respectively. The lower end of heater coil 100A is preferably soldered to the strip 100 at 100B to make electrical contact with the contact point 115, and the other end is connected to the grounded point G by a pigtail 100C. One end of the heater coil 113A is in electrical contact with the binding post 118 by means of a pigtail 113C, and the other end is in contact with the binding post 112 by means of another pigtail 113B. To position a dial D (Figure 8) upstanding brackets 108 and 123 are provided with lugs 124 to which the dial D may be suitably fastened in any convenient manner.

Referring to Figure 9, a schematic diagram of connections is shown in which a rheostatic device 125, comprising a resistance wire, is connected to the heater coil 113A, so that as a contact arm 126, which is suitably connected to a means responsive to variations of a physical effect, cooperates with the resistance 125 to vary the current flowing through the heater coil 113. The bimetallic strip 113 will respond proportionately to variations in current, and will flex in a clockwise direction (Figure 7) to press the contact 115 and the fixed contact 116 into closer relation. The heater coil 113A is connected for this purpose through an igition switch I and a battery B which has one side grounded to complete the circuit to the contact arm 126 which is also grounded. The heater coil 100A has its one end grounded, the other end proceeding to the contact point to the ignition switch I, thence to the battery B and to the ground to complete the circuit.

In the operation of this modification, the contact arm 126, which is controlled by the physical effect, changes the current value in the circuit of the heater coil 113A by varying the resistance 125, so that a proportion will be maintained between the position of the physical effect and the amount of the heat supplied by the heater coil 113A. The controlled amount of heat supplied by the heater coil 113A varies the temperature of the bimetallic strip 113, so that a greater or less force will be evolved to maintain the contacts 115 and 116 in contactual relation. The flexing of the bimetallic strip 113, as pointed out above, is in a clockwise direction, while the bimetallic strip 100, under influence of the heating coil 100, flexes in a counter-clockwise direction. The strip 100 will, therefore, transmit a force to the bimetallic strip 113, tending to move it in a direction opposed to its flexure under heat by means of the spring 111, and inasmuch as the contact points 115 and 116 are in circuit with the heater coil 100A, the circuit therethrough will remain closed as long as the force generated by the bimetallic strip 113 is greater than the force generated by the bimetallic strip 100. The heating will continue until this differential is biased in favor of the bimetallic strip 100. When the force created by the bimetallic strip 100 becomes greater than that generated by the bimetallic strip 113, the resilient means will transmit a force sufficient to move the bimetallic strip 113 backward against the action of the bending caused by the heating of the coil 113A and will thereby open the contact points 115 and 116 to break the circuit through the heater coil 100A. When the circuit is broken through the heater coil 100A, a cooling period will set in for the bimetallic strip 100, allowing it to relax in a clockwise direction to the point where deflectional force of the bimetallic strip 113A is again predominant. At this point, the contact points 115 and 116 will again be closed and a new heating period will be set up in the coil 100A to again cause the bimetallic strip 100 to deflect in a counter-clockwise direction to overcome the clockwise deflectional effort of bimetallic strip 113. The bimetallic strip 113 is not allowed to deflect but only creates a potential force which acts to keep the contacts 115 and 116 in touching relation. The circuit through the heater coil 113 is broken only by the action of the ignition switch I.

In the case of the heater coil 100A, its action is controlled by the bucking action of the two bimetallic strips and when the bias turns in favor of the bimetallic strip 100, by having its temperature increased to a point where the deflection thereof overcomes the potential force of the bimetallic strip 113, the contacts open the circuit through the heater coil 100A and allow the cooling period to set in as described above. The resilient means on spring 111 allows the bimetallic strip 100 considerable latitude of movement which is utilized in positioning the needle 101 about its pivot 107 through the action of the pintle 105 cooperating with the slot 106. In this manner, the current flowing in the heater coil 100A is controlled to maintain the temperature of the bimetallic strip 100 within narrow limits, so that it may assume a position proportionate to the position of the physical effect being measured.

The small dimension of the bimetallic strip 113 is utilized to allow a faster response inasmuch as this element follows the full heating curve described in Figure 10, while the element 100 from which the power to move the indicating pointer is derived, due to the pulsating nature of the current flowing in its heater coil, follows the heating curve described before with reference to the other modifications.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

I claim:

1. In a device of the class described, an electric circuit including a source of energy, controlled variable resistance means in the circuit responsive to a variable datum, thermal means including a heater element in the circuit responsive to the variations of the resistance means to indicate the condition of the datum, and circuit-breaker means to open and close the circuit, said circuit-breaker means being actuated by the thermal means.

2. In a device of the class described, an electric circuit including a source of energy, initiating means responsive to a variable datum to vary current-controlling functions of the circuit in proportion to variations of the datum, indicating means including a pointer responsive to the current-controlling function of the circuit as controlled by the initiating means to indicate the condition of the datum, and circuit-controlling means cooperating with the indicating means and actuated by the deflection thereof to create a series of impulses in the circuit after the pointer has attained a value substantially proportionate to the datum.

3. In a device of the class described, an electric circuit including a source of energy, initiating means responsive to a variable datum to vary current-controlling functions of the circuit in proportion to variations of the datum, deflecting indicating means responsive to the current-controlling functions of the circuit controlled by the initiating means, and circuit-controlling means actuated by the deflection of the indicating means to control the energy supplied to the circuit for actuating the indicating means by creating a series of impulses to limit the energy within predetermined limits.

4. In a device of the class described, an electric circuit including a variable source of energy, the maximum resistance of said circuit being such that a relatively high value current will flow, variable resistance means in the circuit, thermal means in the circuit, thermally responsive means cooperating with the thermal means to assume a position proportional to the temperature of the thermal means, indicating means cooperating with the thermally responsive means, control means cooperating with a variable physical effect for the variable resistance means to control the effectiveness of the resistance means in the circuit upon the thermal means whereby the thermally responsive means will assume a position in proportion to the variable physical effect, means cooperating with the thermally responsive means to lower the current value in the electric circuit when the indicating means has attained a position in proportion to the physical effect, and means to reestablish the initial current flow in the circuit upon cooling of the thermally responsive means to a value to cause a predetermined deflection from the true proportional reading of the indicating means.

5. In a device of the class described, an indicating means responsive to current-controlling functions of an extraneous control circuit, comprising thermally responsive means to actuate an indicator, thermal means in circuit with the extraneous control circuit and cooperating with the thermally responsive means to create a varying temperature proportional to the variation of the functions of the external control circuit, and circuit control means adjacent the thermally responsive means and adapted to be actuated thereby to create alternate heating and cooling periods for the thermally responsive means.

6. In a device of the class described, an indicating means responsive to a current-controlling function of an extraneous control circuit comprising a stationary contact, a movable contact cooperating therewith, thermally responsive means cooperating with an indicator, a heater coil in circuit with the extraneous circuit cooperating with the thermally responsive means and the contacts to create a mean temperature adjacent the thermally responsive means proportionate to the variations of the functions of the extraneous control circuit, and control means for the contacts to break the circuit through the heater coil when the mean temperature adjacent the thermally responsive means exceeds a predetermined limit to allow cooling of the thermally responsive means.

7. In a device of the class described, a multiplicity of thermal elements, heating elements cooperating with some of the thermal elements, an indicating means, an extraneous control circuit to vary the mean temperatures of the heating elements in proportion to a variable physical effect, to create a capacity in the thermal elements to position the indicating means proportionate to the physical effect, control means cooperating with the thermal elements to create alternate heating and cooling periods in the heating elements to maintain the mean temperature of the thermal elements within predetermined limits of variation.

8. In a device of the class described, a pair of cooperating bimetallic strips, heater elements cooperating with the strips of a capacity to change temperatures of the strips at a relatively high rate, an indicating means cooperating with the strips and adapted to assume varying positions under the influence of the strips, an electrical circuit including the heater elements, the temperatures of the heating elements being controlled by a variable resistance controlled by a variable physical effect to change the mean temperatures of the strips in a proportion to the physical effect and establish the influence of the strips over the indicating means, so that the indicating means will assume a position proportional to the variation of the physical effect, and circuit-controlling means in the electrical circuit under the control of the strips to create heating and cooling periods in the heater elements to maintain the mean temperature of the strips within predetermined limits of variation.

9. In a device of the class described, an indicating means responsive to a variable resistance means controlled by a physical effect, an extraneous control circuit including a source of electrical energy, comprising a plurality of thermally responsive means cooperating together to actuate the indicating means, heater means cooperating with some of the thermally responsive means, and circuit-control means cooperating with the thermally responsive means to maintain the temperature of the thermally responsive means cooperating with the heater means within predetermined limits of a value proportional to the physical effect by opening and closing the circuit through the heater means when the temperature variation of the thermally responsive means exceeds the predetermined limits.

10. In a device of the class described, an electric circuit whose resistances are variable in proportion to an effect to be measured, a pair of heater means in the circuit, a variable E. M. F. in the circuit to maintain temperatures in the heater means proportional to the resistances in the circuit, thermally responsive means cooperating with each of the heater means and moving a pointer by deflection to indicate variations of the resistances in the electric circuit, and circuit control means cooperating with both of the thermally responsive means to create a series of pulsations in the heater means when the E. M. F. creates a temperature in the heater means exceeding the value of temperature necessary to cause deflections of the thermally responsive means proportional to the resistances of the circuit by a predetermined amount to produce alternate heating and cooling periods to maintain the average proportional temperature in the thermally responsive elements just sufficient by their resulting deflection to move the pointer to give a proportional reading.

11. In a device of the class described, an indicating means responsive to resistance values of an extraneous control circuit including a source of electrical energy, comprising a pair of adjacent thermally responsive means to actuate the indicating means, heater means in the extraneous control circuit and cooperating with the thermally responsive means, and circuit control means cooperating with the thermally responsive means to open and close the circuit through the heater means to maintain the temperature of the thermally responsive means within predetermined limits of a value proportional to the resistance values of the extraneous circuit just sufficient to cause deflection of the thermally responsive means to cause a proportionate displacement of the indicating means.

12. In a device of the class described, thermally responsive means to actuate an indicating pointer, ambient temperature compensating means cooperating with the thermally responsive means, heater means cooperating with the thermally responsive means in circuit with a source of electrical energy and a control variable resistance to enable the heater means to assume a temperature proportionate to values of the variable resistance, voltage-compensating means cooperating with the heater means and the thermally responsive means, and control means for the circuit activated by the thermally responsive means to create a series of pulsations in the heater means when the E. M. F. of the source of electrical energy creates a temperature in the heater means exceeding a predetermined limit from the temperature proportionate to the value of the variable resistance sufficient for the thermally responsive means to move the pointer to a proportionate reading.

13. In a device of the class described, an indicating means responsive to controlled resistance values of an extraneous control circuit including a source of electrical energy, comprising a pair of thermally responsive means in bucking relation to actuate the indicating means in the extraneous control circuit and heater means cooperating with the thermally responsive means, and circuit-control means activated by the thermally responsive means to maintain the energy input to the heater means substantially constant and maintain mean temperatures in the thermally responsive means at values at which the indicating means is deflected to a position proportionate to the resistance values of the extraneous control circuit.

14. In a device of the class described, an indicating means responsive to controlled resistance values of an extraneous control circuit including a source of electrical energy, a pair of thermally responsive elements corrected for changes of ambient temperature, heater elements for each of the thermally responsive elements in circuit with the extraneous control circuit, the energy in the heater elements being proportional to the resistance values of the extraneous control circuit to cause proportional deflections of the thermally responsive elements, an indicating pointer cooperating with the thermally responsive elements and adapted to integrate the deflections of the thermally responsive elements to assume an indicating position proportionate to the resistance values of the extraneous control circuit, and circuit-control means operable by the thermally responsive elements to maintain the mean temperature in the heater elements within predetermined limits proportionate to the resistance values of the extraneous control circuit, whereby the energy in the heater elements may be broken into pulsations.

15. In an indicating instrument, a thermally responsive means, heater means for the thermally responsive means under control of an extraneous circuit to maintain the temperature of the thermally responsive means substantially proportionate to controlled resistance values of the extraneous circuit, a source of energy capable of supplying energy to the heater means at a relatively high rate, circuit-breaking means cooperating with the thermally responsive means to break the circuit in the heater means to control the temperature of the thermally responsive means to predetermined limits from the value proportionate to the resistance values of the extraneous control circuit.

16. In a device of the class described, an indicating pointer, a pair of thermally responsive means cooperating with the pointer and adapted to displace the pointer by mutually bucking each other, heater elements cooperating with each of the thermally responsive means and a circuit with an extraneous control circuit controlling the heating effect of the heater elements in proportion to an external physical effect to be measured, and means cooperating with the thermally responsive means to reduce the heating effect of the heater elements when a bucking force of predetermined value is obtained between the thermally responsive means.

17. In a device of the class described, thermally responsive means, heater means cooperating with the thermally responsive means, indicator means cooperating with the thermally responsive means to indicate the condition of a varying physical effect, variable resistance means cooperating with the varying physical effect and adapted to be controlled thereby to assume a proportional value, a source of electrical energy in circuit with the resistance means and the heater means whereby the resistance value of the variable resistance means controls the temperature of the heater means and the resultant temperature of the thermally responsive means to move the indicator means to a proportional reading, the temperature of the heater means increasing at a relatively high rate, and control means actuated by the distortion of the thermally responsive means to limit the amount of energy supplied to the heater means to create a distortion in the thermally responsive means just sufficient to produce substantially the proportionate deflection of the indicating means.

18. In an indicating instrument, a thermally responsive means to actuate an indicating means, heater means for the thermally responsive means under control of an extraneous circuit including a controlled variable resistance, a source of energy in the circuit capable of supplying energy to the heater means at a relatively high rate, circuit-controlling means in the circuit and actuated by the thermally responsive means to control the energy within predetermined limits from the amount of energy necessary to obtain temperatures in the thermally responsive means to maintain the position of the indicating means proportionate to the controlled variable resistance, the energy being supplied to the heater means at the relatively high rate to increase the rate of change of the temperature in the thermally responsive means.

19. In a device of the class described, an indicating means, a thermally responsive means to move the indicating means by distortion, heater means to supply heat to the thermally responsive means in proportionate amounts to cause the indicating means to be moved by the resultant distortion of the thermally responsive means to a position having a proportion to a physical effect being measured, and control means cooperating with the thermally responsive means and adapted to be actuated by the distortion thereof to limit the energy supplied to the heater means to an amount just sufficient to cause a proportionate deflection of the indicating means.

20. In a device of the class described, a pair of thermally responsive elements in bucking relation, an indicating means adapted to be moved by cooperating with both of the thermally responsive elements and positioned at a point integrating the distortions of the thermally responsive elements, heater elements for the thermally responsive elements, a source of electrical energy, resistance means in circuit with the heater means, slider means under control of a varying physical effect cooperating with the resistance means and adapted to proportion the amount of current flowing in the heater elements cooperating with each of the thermally responsive elements having a relation to the varying physical effect, and control means actuated by the distortion of the thermally responsive elements to limit the energy supplied to the heater elements to an amount just sufficient to cause distortion of the thermally responsive elements to deflect the indicating means to a value having a proportion to the physical effect.

21. In a device of the class described, variable resistance means cooperating with a variable datum and adapted to be varied in proportion to a value thereof, a pair of thermally responsive means in bucking relation, heater elements for the thermally responsive means in circuit with the variable resistance and a variable source of electrical energy, indicating means cooperating with both thermally responsive means and adapted to assume a position under the control of the thermally responsive means proportionate to the variable physical effect, and circuit-breaker means cooperating with the thermally responsive means to open the circuit through the heater elements when a predetermined bucking force is obtained between the thermally responsive means.

22. In a device of the class described, an indicating instrument adapted to indicate the condition of a physical effect comprising a stationary contact, a movable contact cooperating therewith, a source of electrical energy, a pair of thermally responsive means adapted to cooperate together, a pointer means cooperating with the thermally responsive means, heater elements cooperating with the thermally responsive means and in circuit with the contact points, the source of electrical energy and an external control circuit to create temperatures in the heater elements for deflection of the thermally responsive means to move the pointer means proportional to a value of the physical effect, said movable contact point being under the control of the thermally responsive means to open the circuit through the heater elements when the deflection of the cooperating thermally responsive means exceeds a predetermined limit.

23. In a device of the class described, an electric circuit including a variable source of energy, variable resistance means in the circuit controlled by a varying physical effect, a pair of heater elements in parallel circuit with a portion of the resistance, the proportion of the resistance in circuit with each of the heater elements having a proportion to the varying physical effect, thermally responsive means cooperating with each of the heater elements and upon increase in temperature are adapted to deflect toward each other until a cooperative relation is established between them, a pivot, a pointer mounted on the pivot and adapted to cooperate with the thermally responsive means adjacent the locus of their cooperative relation, a pair of contact points in the electric circuit and adapted to open the circuit, one of the contacts is relatively fixed and the other relatively movable and under the control of the thermally responsive means, whereby the circuit through the heater elements is adapted to be opened when a predetermined bucking force is obtained between the thermally responsive means.

JOSEPH I. LINER.